No. 845,871. PATENTED MAR. 5, 1907.
H. HESS.
FRICTION PULLEY.
APPLICATION FILED JUNE 15, 1906.
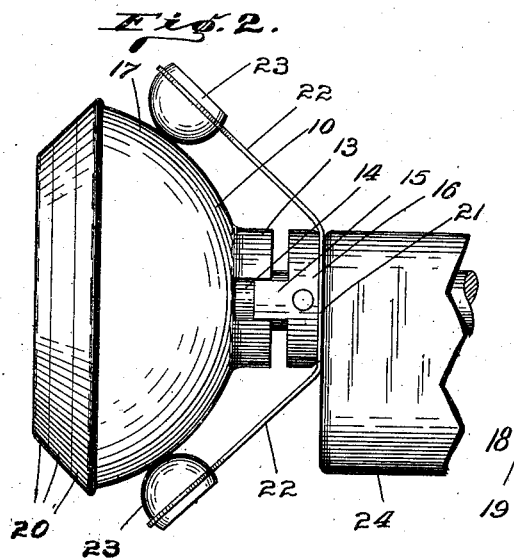
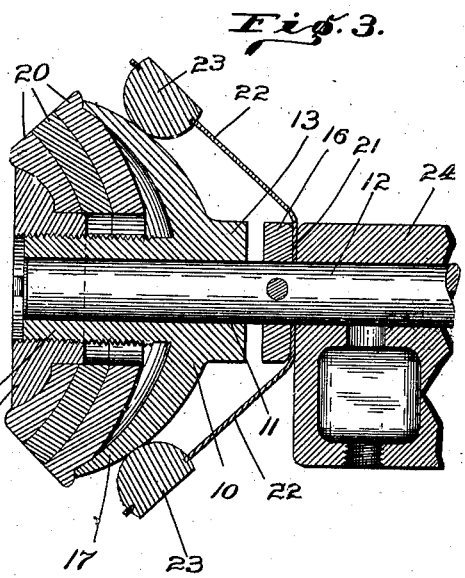
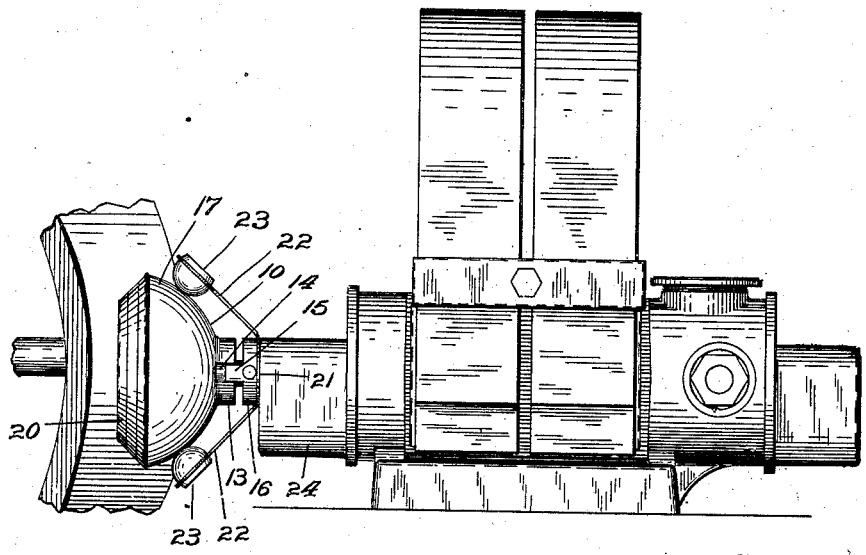
Witnesses
Frank A. Fahle
Ruth Worthington
Inventor
Herman Hess
By Bradford Hood
Attorneys

UNITED STATES PATENT OFFICE.

HERMAN HESS, OF INDIANAPOLIS, INDIANA.

FRICTION-PULLEY.

No. 845,871. Specification of Letters Patent. Patented March 5, 1907.

Application filed June 15, 1906. Serial No. 321,788.

*To all whom it may concern:*

Be it known that I, HERMAN HESS, a citizen of the United States, residing at Indianapolis, in the county of Marion and State of Indiana, have invented certain new and useful Improvements in Friction-Pulleys, of which the following is a specification.

The object of my invention is to produce a friction-pulley the friction-face of which is formed of one or more rings of friction material, such as leather, the construction being such that the parts may be readily assembled under such conditions as to stiffen and harden the friction material.

A further object of my invention is to so associate such a pulley with a machine to be driven—as, for instance, a small electric generator—that the base of the machine may be rigidly fixed, while the pulley will be yieldingly urged into engagement with a driving wheel or pulley in order to compensate for inequalities of the two contacting surfaces.

The accompanying drawings illustrate my invention.

Figure 1 is a side elevation of a magneto-generator equipped with my improved friction-pulley; Fig. 2, an enlarged side elevation of said pulley, together with means for urging it in one direction on its shaft; and Fig. 3, an axial section of the structure shown in Fig. 2.

In the drawings, 10 indicates a main body provided with a bore 11 to receive the shaft 12, the fit being accurate, but sufficiently free to permit free axial play of the body 10 on the shaft. At its inner end the body 10 is provided with a hub 13, having axial notches 14, adapted to receive fingers 15, carried by a collar 16, pinned upon the shaft 12, thus forming a rotative connection between the main body 10 and the shaft 12. The body 10 is provided with a cupped flange 17 and an internal hub 18, threaded on its outside. The threads of hub 18 are adapted to receive a head 19, the inner face of said head 19 being convex. The friction-face of the pulley is formed by the circumferential edges of a plurality of rings or washers 20, of desirable material, such as leather, said rings or washers having central openings sufficiently large to receive the hub 18 of body 10. A sufficient number of rings 20 is placed between flange 17 and head 19 and the head 19 then screwed tightly into place, the several washers 20 being thus cupped into the cup 17 and their outer edges pinched tightly between the edge of cup 17 and the head 19.

Where leather is used for the friction material, it is preferable to wet the rings before they are forced into position, so that when they harden a very lasting friction-face is formed.

In order to yieldingly urge the pulley axially on the shaft 12, I provide a plate 21, having oppositely-extending spring-fingers 22, each of which carries at its outer end a hemispherical knob 23, the spherical face of which engages the spherical outer face of the flange 17. The plate 21 is arranged between collar 16 and the body 24, within which the shaft 12 is journaled.

I claim as my invention—

1. The combination, with a shaft, of a friction-pulley sleeved thereon and axially movable thereon, a rotative connection between the pulley and the shaft, and a pair of weighted spring-fingers having a sliding engagement with said pulley and adapted to urge the same axially on the shaft.

2. The combination, with a shaft, of a friction-pulley sleeved thereon and axially movable thereon, a rotative connection between the pulley and the shaft, a perforated plate sleeved upon the shaft and carrying a pair of oppositely-extending spring-fingers, means for holding the plate against axial displacement on the shaft, and a pair of weights carried one by each of said spring-fingers and having a sliding engagement with the pulley to urge the same axially on the shaft.

In witness whereof I have hereunto set my hand and seal, at Indianapolis, Indiana, this 1st day of June, A. D. 1906.

HERMAN HESS. [L. S.]

Witnesses:
ARTHUR M. HOOD,
THOMAS W. MCMEANS.